(12) United States Patent
Mikawa et al.

(10) Patent No.: US 9,531,101 B2
(45) Date of Patent: Dec. 27, 2016

(54) CONNECTOR

(71) Applicant: Japan Aviation Electronics Industry, Limited, Tokyo (JP)

(72) Inventors: Kazuya Mikawa, Tokyo (JP); Akihiro Matsunaga, Tokyo (JP); Masaaki Shimada, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 14/618,093

(22) Filed: Feb. 10, 2015

(65) Prior Publication Data

US 2015/0294125 A1 Oct. 15, 2015

(30) Foreign Application Priority Data

Apr. 9, 2014 (JP) ................................ 2014-079932

(51) Int. Cl.
*H01R 24/00* (2011.01)
*H01R 13/24* (2006.01)
*G06K 7/00* (2006.01)

(52) U.S. Cl.
CPC ........... *H01R 13/2442* (2013.01); *G06K 7/003* (2013.01)

(58) Field of Classification Search
CPC .............................. H01R 13/627; H01R 24/00
(Continued)

(56) References Cited

U.S. PATENT DOCUMENTS 5,603,629 A * 2/1997 DeFrasne ............. G06K 7/0021
439/326
6,799,724 B2 * 10/2004 Shimada .............. G06K 7/0021
235/439
(Continued)

FOREIGN PATENT DOCUMENTS

DE WO 02056419 A3 * 12/2002 ........... G06K 7/0021
JP S48-030755 U 4/1973
(Continued)

OTHER PUBLICATIONS

JP 2013206663 Ejri K et al., english translation attatched.*
(Continued)

*Primary Examiner* — Abdullah Riyami
*Assistant Examiner* — Nader Alhawamdeh
(74) *Attorney, Agent, or Firm* — Collard & Roe, P.C.

(57) ABSTRACT

The connector comprises a holding member and a contact which is held by the holding member. The contact has a fixed portion, a first spring portion and a second spring portion. The fixed portion is held by and fixed on the holding member. The first spring portion extends from the fixed portion. The first spring portion includes two pressed portions, a movable starting point and a movable end portion which is movable. When an inserting object is moved along a moving direction which is a forward direction or a rearward direction, the pressed portions are pressed by a press portion to be moved downward perpendicular to the moving direction. The inserting object is a card or a card adapter. The inserting object has the press portion. The second spring portion is provided with a free end and a contact point. When the inserting object is moved in the moving direction, the second spring portion is moved downward together with a movement of the movable starting point so that the inserting
(Continued)

object is prevented from being brought into contact with the free end of the second spring portion.

12 Claims, 9 Drawing Sheets

(58) Field of Classification Search
USPC .................................................. 439/457, 357
See application file for complete search history.

(56) References Cited

U.S. PATENT DOCUMENTS

| | | | |
|---|---|---|---|
| 6,863,537 B2* | 3/2005 | Pellizari | G06K 7/0021 439/108 |
| 7,364,820 B2* | 4/2008 | Tanaka | G06K 7/0021 439/630 |
| 7,384,294 B2* | 6/2008 | Washino | G06K 7/0021 439/326 |
| 7,708,598 B2* | 5/2010 | Hu | G06K 13/08 439/188 |
| 8,657,629 B2* | 2/2014 | Tian | G06K 7/0021 439/630 |
| 2002/0187666 A1* | 12/2002 | Harasawa | H01R 13/2442 439/74 |
| 2005/0266741 A1 | 12/2005 | Miyamoto et al. | |
| 2008/0153358 A1* | 6/2008 | Tanaka | G06K 7/0021 439/638 |
| 2012/0231650 A1* | 9/2012 | Tian | G06K 7/0021 439/374 |
| 2013/0095687 A1* | 4/2013 | Sato | H01R 12/57 439/357 |
| 2013/0237097 A1* | 9/2013 | Nakamura | H01R 13/64 439/633 |

FOREIGN PATENT DOCUMENTS

| | | | |
|---|---|---|---|
| JP | H05-013122 A | 1/1993 | |
| JP | H10-032031 A | 2/1998 | |
| JP | 2002-367697 A | 12/2002 | |
| JP | 2004-152623 A | 5/2004 | |
| JP | 2006-019236 A | 1/2006 | |
| JP | 4733610 B2 | 4/2008 | |
| JP | 2009-129890 A | 6/2009 | |
| JP | 4844927 B2 | 12/2011 | |
| JP | 5181397 B2 | 5/2012 | |
| JP | 2013-089290 A | 5/2013 | |
| JP | 2013089290 | * 5/2013 | ............. H01R 12/71 |
| JP | 2013089290 A | * 5/2013 | |
| JP | 2013206663 | * 7/2013 | ............. H01R 12/82 |
| JP | 2013206663 | * 10/2013 | ............. H01R 12/52 |
| JP | 2013206663 A | * 10/2013 | |
| JP | 2014-075332 A | 4/2014 | |
| WO | 02-056419 A | 7/2002 | |
| WO | 2012-076396 A | 6/2012 | |

OTHER PUBLICATIONS

Japanese Office Action issued Dec. 16, 2015 in JP 2015-018313 with English translation.
Korean Office Action in KR 10-2015-0040139, issued Jan. 28, 2016.

* cited by examiner

CONNECTOR

CROSS REFERENCE TO RELATED APPLICATIONS

An applicant claims priority under 35 U.S.C. §119 of Japanese Patent Application No. JP2014-079932 filed Apr. 9, 2014.

BACKGROUND OF THE INVENTION

This invention relates to a connector to be connected to a card such as a Subscriber Identity Module (SIM) card.

A connector of this type is disclosed in JP-A 2009-129890 (Patent Document 1). As shown in FIG. 16, the connector 500 of Patent Document 1 comprises a holding member 501 and a contact 502 which is held by the holding member 501. The contact 502 has a contact point 503 and a shoe portion 504. The contact point 503 has a chevron shape. The shoe portion 504 is positioned forward of the contact point 503. The holding member 501 is provided with a support portion 505. When a card 506 is inserted into the connector 500, the contact point 503 is pressed by the card 506 to be resiliently deformed, so that the shoe portion 504 is slid on the support portion 505. Accordingly, even if the connector 500 is reduced in height, the connector 500 can secure a contact pressure between the contact 502 and an electrode 507 of the card 506.

However, the connector 500 of Patent Document 1 is needed to have the contact 502 which has an increased length. Accordingly, the connector 500 cannot be miniaturized.

If the shoe portion 504 is removed from the contact 502 of Patent Document 1, the contact 502 can have a shortened length. In addition, if an initial position of the contact point 503 of the contact 502 is shifted above its original initial position shown in FIG. 16, a moving distance of contact point 503 can be increased, so that the contact pressure can be increased. However, this configuration may cause the contact 502 to be buckled when the card 506 is inserted into the connector 500.

SUMMARY OF THE INVENTION

In order to secure a sufficient moving distance of a contact point and to prevent a contact from being buckled, a connector of the present invention has two parts which are functionally separated from each other. One of the two parts is to be pressed by a card to be resiliently deformed. A remaining one of the two parts functions as a contact point. Specifically, the present invention provides the following connector as means for solving the aforementioned drawbacks.

One aspect of the present invention provides a connector into which a card is insertable along a rearward direction. The card is removable from the connector along a forward direction. The card has an electrode. The connector comprises a holding member and a contact which is held by the holding member. The contact has a fixed portion, a first spring portion and a second spring portion. The fixed portion is held by and fixed on the holding member. The first spring portion extends from the fixed portion. The first spring portion includes two pressed portions, a movable starting point and a movable end portion which is movable. Each of the two pressed portions is positioned between the movable end portion and the fixed portion. When an inserting object is moved along a moving direction which is the forward direction or the rearward direction, the pressed portions are pressed by a press portion to be moved downward perpendicular to the moving direction. The inserting object is the card or a card adapter. The inserting object has the press portion. The card adapter has a frame body. The frame body has an outer shape same as a shape of the card. When the pressed portions are moved downward, the movable starting point is moved downward. The second spring portion extends from the movable starting point. The second spring portion is positioned between the two pressed portions in a lateral direction perpendicular to both the moving direction and a downward direction. The second spring portion is provided with a free end and a contact point. The contact point is to be brought into contact with the electrode of the card. The contact point is positioned between the free end and the movable starting point. When the inserting object is moved in the moving direction, the second spring portion is moved downward together with a movement of the movable starting point so that the inserting object is prevented from being brought into contact with the free end of the second spring portion.

The contact according to the present invention is configured to have the first spring portion and the second spring portion which are separately formed. In detail, the first spring portion is resiliently deformed by a movement of the inserting object (card or card adapter), and the second spring portion is provided with the contact point. When the inserting object is moved, the second spring portion is moved downward, so that the inserting object is prevented from being brought into contact with the free end of the second spring portion. Accordingly, the contact can be prevented from being buckled, while the sufficient moving distance of the contact point is secured.

An existing contact can be prevented from being buckled when the card is moved in the rearward direction (insertion direction). However, when the card adapter is moved in the forward direction (removal direction), the existing contact may be buckled. In the present invention, the contact can be prevented from being buckled both when the card is moved in the rearward direction (insertion direction) and when the card adapter is moved in the forward direction (removal direction).

An appreciation of the objectives of the present invention and a more complete understanding of its structure may be had by studying the following description of the preferred embodiment and by referring to the accompanying drawings.

Figure 1:
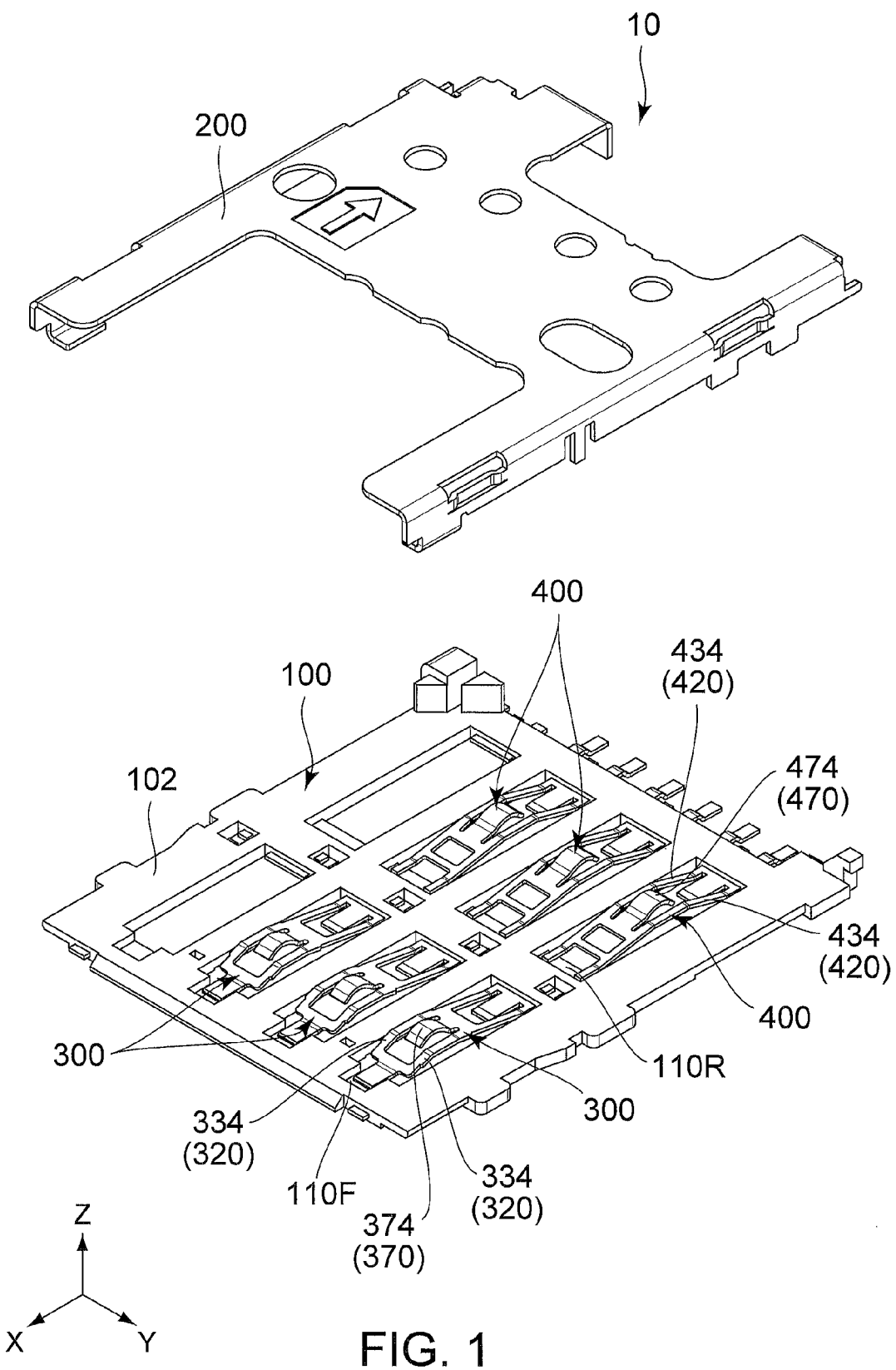
FIG. 1 is an exploded, perspective view showing a connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
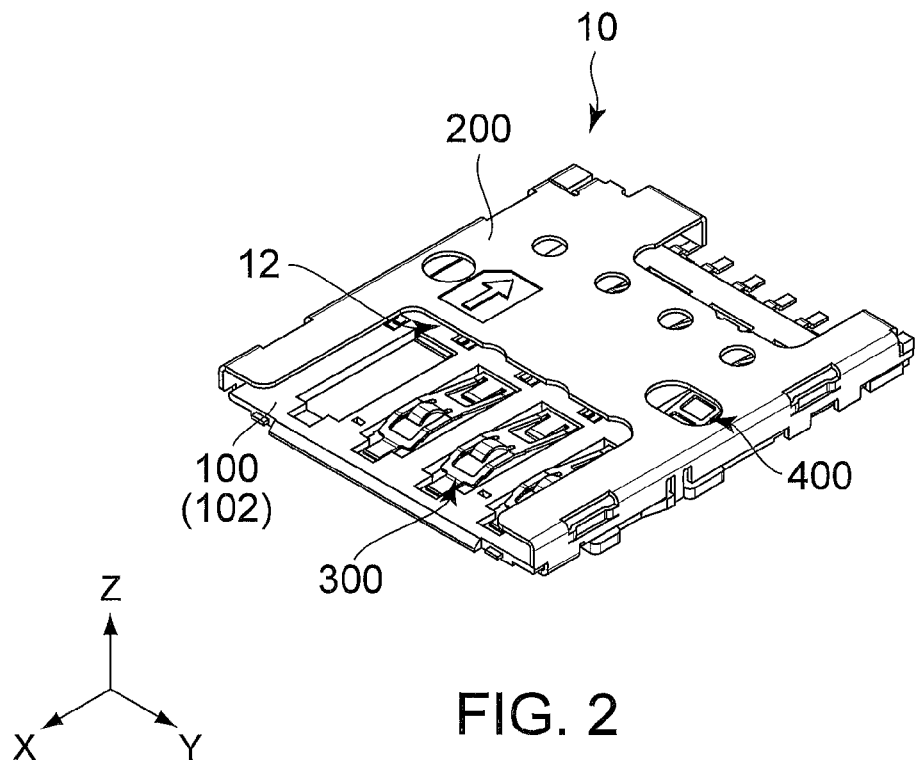
FIG. 2 is a perspective view showing the connector of FIG. 1.
Figure 3:
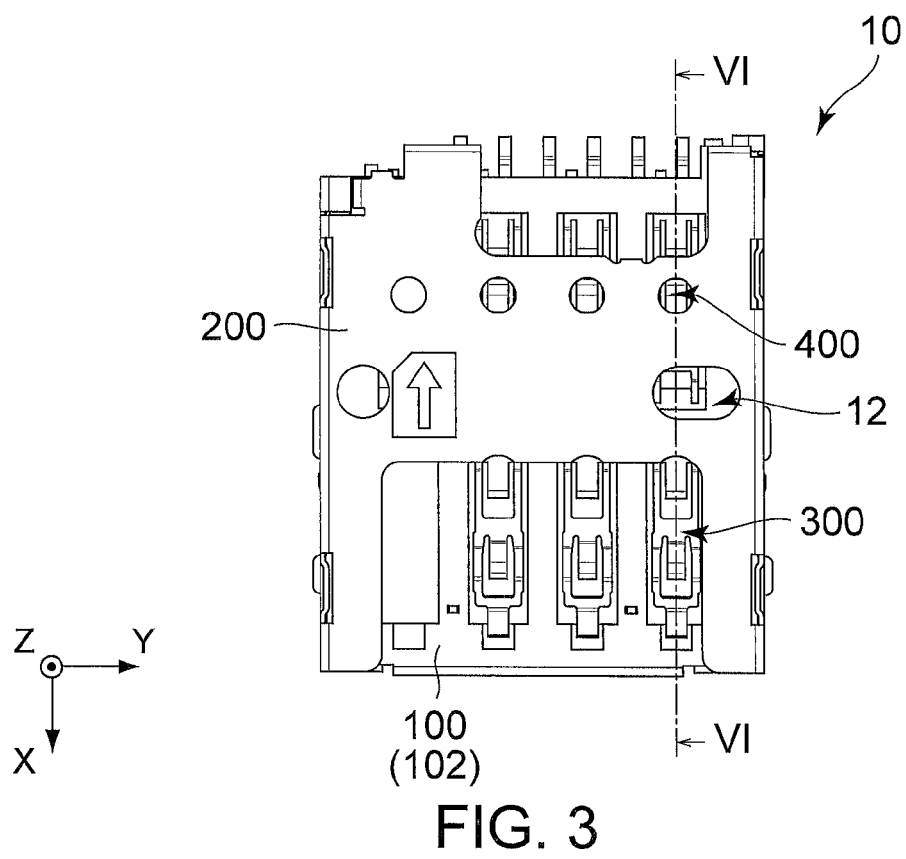
FIG. 3 is a top view showing the connector of FIG. 2.
Figure 11:
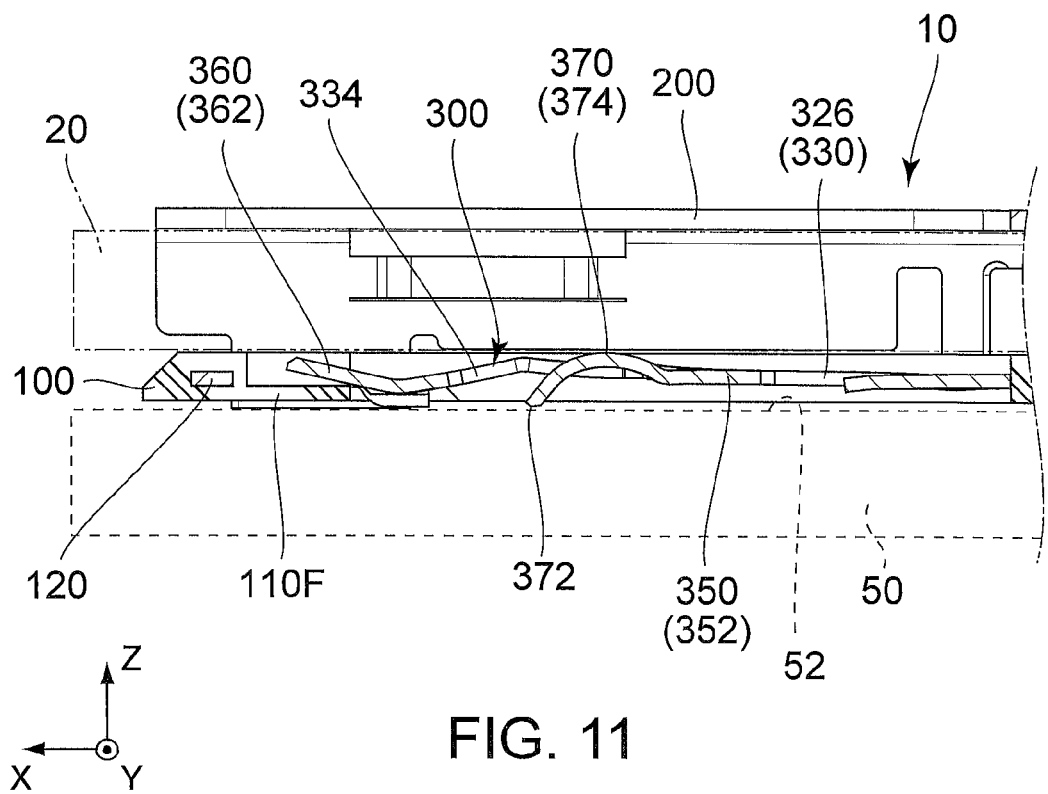
FIG. 11 is an enlarged, cross-sectional view showing a part of the connector of FIG. 6. The card, whose outline is illustrated by two-dot chain line, is inserted into the connector so that the front contact is deformed. The connector is mounted on and fixed to a mount surface of a circuit board whose outline is illustrated by dotted line.
Figure 12:
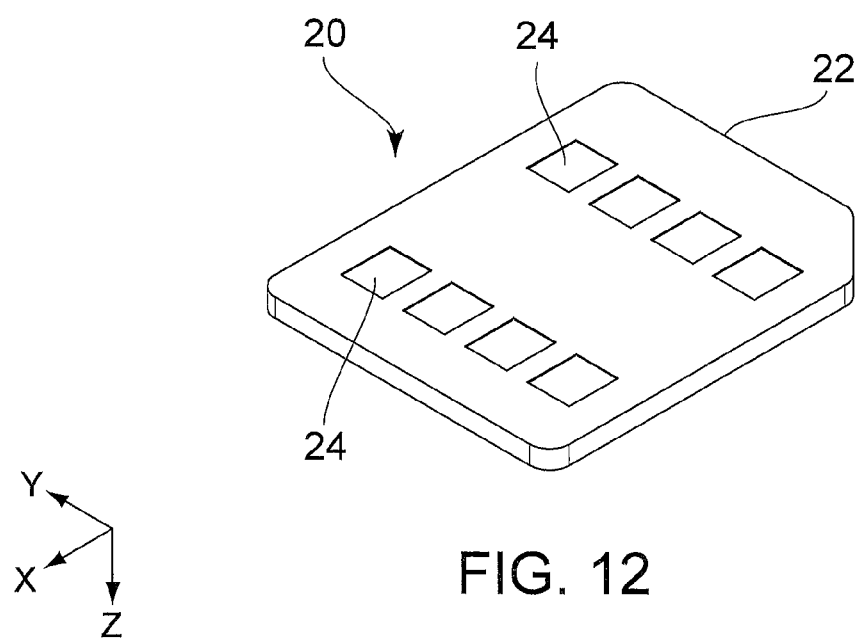
FIG. 12 is a perspective view showing a card which is connectable to the connector of FIG. 2.

With reference to FIGS. 1 to 6, a connector 10 according to an embodiment of the present invention is used to be connected with a card 20 (see FIG. 12). As shown in FIG. 2, the connector 10 according to the embodiment of the present invention has an accommodation portion 12 which can accommodate a part of the card 20. Specifically, the card 20 is insertable along a rearward direction (negative X-direction) into the connector 10, and is removable along a forward direction (positive X-direction) therefrom. As shown in FIG. 11, the connector 10 of the present embodiment is fixed on a mount surface 52 of a circuit board 50 when used.

Figure 13:
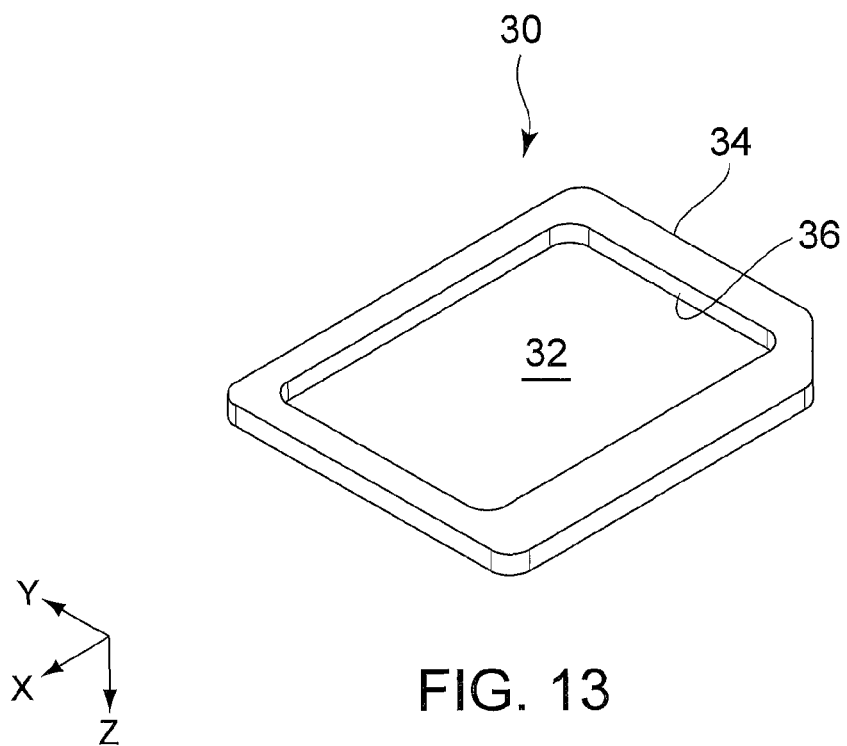
FIG. 13 is a perspective view showing a card adapter which corresponds to the card of FIG. 12.

The card 20 shown in FIG. 12 is a micro SIM card and has a plurality of electrodes 24. In other words, the connector 10 is used for the micro SIM card. FIG. 13 shows a card adapter 30. The card adapter 30 is used for connecting a nano SIM card (not shown), which is smaller than the micro SIM card, to the connector 10 (see FIG. 2). Specifically, the card adapter 30 has a frame body which has an outer shape same as a shape of the card 20 (see FIG. 12). The frame body has an inner wall 36. An inside of the frame body of the card adapter 30 is formed with a space 32 which corresponds to an outer shape of the nano SIM card (not shown). The nano SIM card (not shown) is received in the space 32 of the card adapter 30, and the card adapter 30 is then inserted into the connector 10 together with the nano SIM card (not shown), so that the nano SIM card (not shown) can be connected with the connector 10.

As understood from the above explanation, either the card 20 (see FIG. 12) or the card adapter 30 (see FIG. 13) is insertable as an inserting object into the connector 10 of the present embodiment (see FIG. 2). The card 20 has a first front edge 22 in an insertion direction (i.e. rearward direction: negative X-direction). The card adapter 30 has a second front edge 34 in the insertion direction (i.e. rearward direction: negative X-direction). It is necessary to prevent a contact from being buckled by the first front edge 22 when the card 20 is inserted into the connector 10 and by the second front edge 34 when the card adapter 30 is inserted thereinto. In addition, in a case where the card adapter 30 is inserted into the connector 10 without receiving the nano SIM card (not shown), it is necessary to prevent the contact from being buckled by the inner wall 36 close to the second front edge 34 when the card adapter 30 is removed along a removal direction (i.e. forward direction: positive X-direction). Especially, it is necessary to prevent the contact from being buckled by a part of the inner wall 36 of the card adapter 30 which intersects the forward direction. Accordingly, the connector 10 of the present embodiment has a first structural feature which prevents the contact from being buckled by a press portion when an inserting object is moved along a moving direction, wherein the inserting object and the press portion are the card 20 and the first front edge 22 or the card adapter 30 and the second front edge 34, and the moving direction is the rearward direction. In addition, the connector 10 of the present embodiment has a second structural feature which prevents the contact from being buckled by a press portion when an inserting object is moved along a moving direction, wherein the inserting object is the card adapter 30 without receiving the nano SIM card (not shown), the moving direction is the forward direction, and the press portion is the part of the inner wall 36 of the card adapter 30 which intersects the forward direction.

Although the first structural feature is essentially same as the second structural feature, a moving direction of the inserting object corresponding to the first structural feature is opposite to that corresponding to the second structural feature. Accordingly, the first structural feature and the second structural feature are arranged toward orientations opposite to each other in a front-rear direction (X-direction). It is described below as structural details of the connector 10 of the present embodiment which include the first structural feature and the second structural feature.

As shown in FIG. 1, the connector 10 of the present embodiment comprises a holding member 100, a shell 200, front contacts (contacts) 300 and rear contacts (contacts) 400. The connector 10 is mainly made of insulator. The shell 200 is made of metal. Each of the front contacts 300 is made of metal. Each of the rear contacts 400 is made of metal.

The holding member 100 holds the front contacts 300 and the rear contacts 400. The front contacts 300 are positioned forward of the rear contacts 400, respectively. In the present embodiment, the front contacts 300 and the rear contacts 400 are incorporated in the holding member 100 upon a molding of the holding member 100 via insert-molding process.

Figure 6:
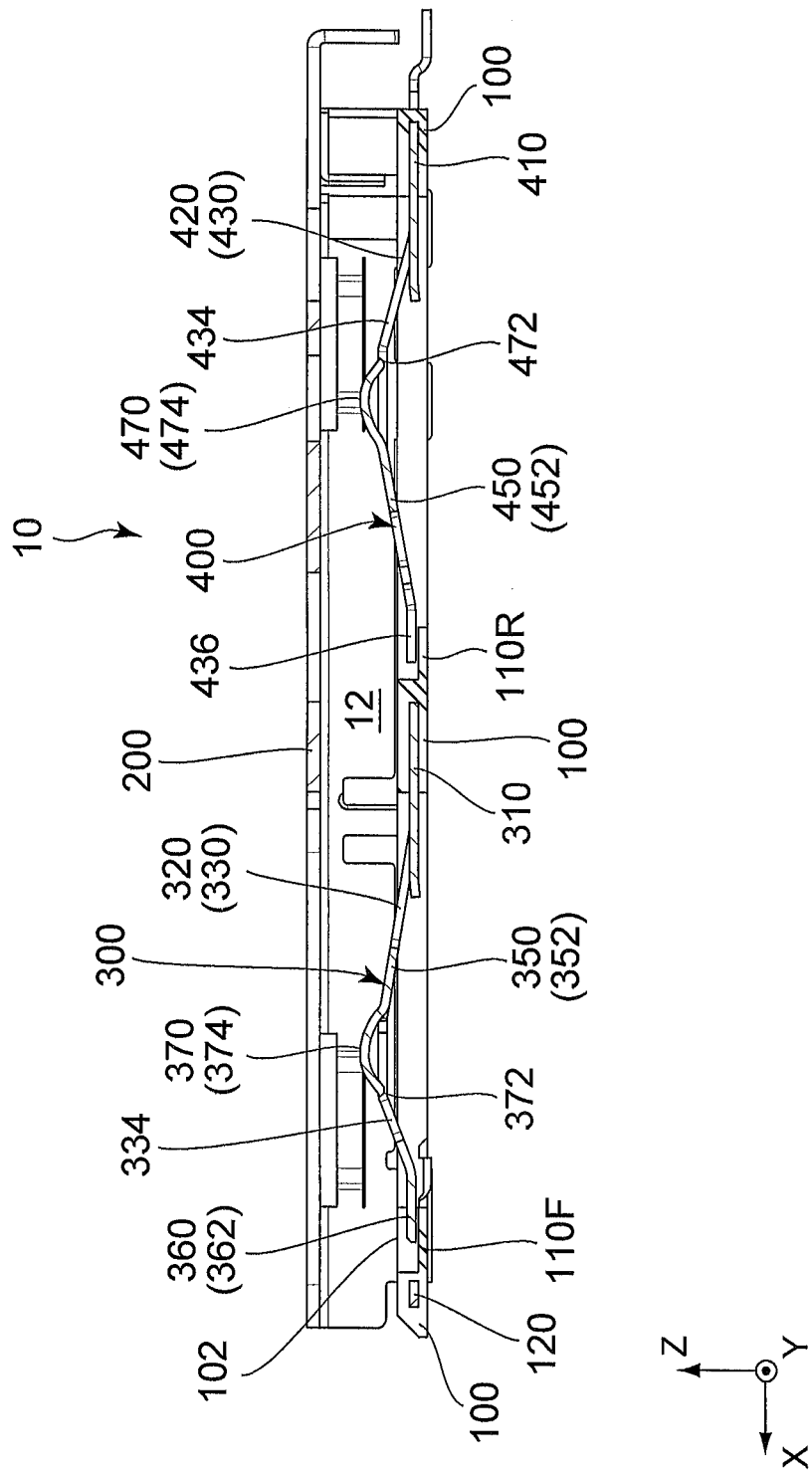
FIG. 6 is a cross-sectional view showing the connector of FIG. 3, taken along line VI-VI.

The shell 200 and the holding member 100 are coupled with each other to form the aforementioned accommodation portion 12. In other words, the shell 200 is attached to the holding member 100 and forms the accommodation portion 12 together with the holding member 100. As understood from FIGS. 1 and 2, the holding member 100 has a principal surface 102 which forms a bottom surface of the accommodation portion 12. As shown in FIGS. 1 and 6, the holding member 100 is formed with receiving portions 110F, 110R. As described later, the receiving portions 110F receive parts of the front contacts 300, respectively, and the receiving portions 110S receive parts of the rear contact 400, respectively. In addition, a reinforcing member 120, which is made of metal, is embedded into the holding member 100 of the present embodiment. Accordingly, the holding member 100 has sufficient strength while having a reduced thickness.

Figure 7:
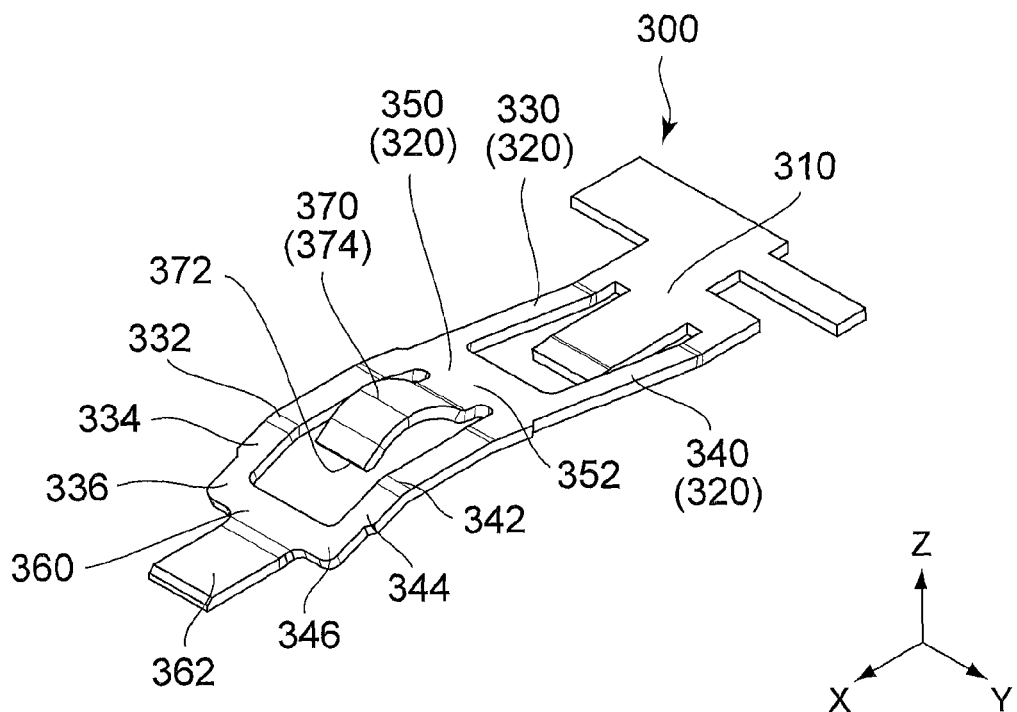
FIG. 7 is a perspective view showing a front contact which is included in the connector of FIG. 1.

As understood from FIGS. 6 and 7, each of the front contacts 300 has a fixed portion 310, a first spring portion 320 and a second spring portion 370. The fixed portion 310 is held by and fixed on the holding member 100. The first spring portion 320 extends from the fixed portion 310. The second spring portion 370 extends from the first spring portion 320.

As shown in FIG. 7, the first spring portion 320 has a first beam portion 330, a second beam portion 340, a coupling portion 350 and a connection end portion 360.

As shown in FIG. 7, each of the first beam portion 330 and the second beam portion 340 extends roughly in the front-rear direction (X-direction). The first beam portion 330 has a pressed portion 334 and a first front end portion 336. Specifically, the pressed portion 334 is provided as a part of the first beam portion 330. As shown in FIG. 6, the pressed portion 334 intersects the front-rear direction in an initial state where the card 20 or the card adapter 30 is not yet inserted into the connector 10. As understood from FIGS. 6 and 7, the second beam portion 340 has a pressed portion 344 and a second front end portion 346. Specifically, the pressed portion 344 is provided as a part of the second beam portion 340. The pressed portion 344 intersects the front-rear direction in the initial state. Accordingly, when the inserting object (card 20 shown in FIG. 12 or card adapter 30 shown in FIG. 13) is moved along the moving direction (rearward), the pressed portions 334, 344 are pressed by the press portion (i.e. first front edge 22 or second front edge 34) to be moved downward (in the negative Z-direction).

As shown in FIG. 7, the coupling portion 350 couples the first beam portion 330 with the second beam portion 340 in a lateral direction (Y-direction). Specifically, the first spring portion 320 has a portion having an H-like shape which is formed by the first beam portion 330, the second beam portion 340 and the coupling portion 350. In the present embodiment, a middle of the coupling portion 350 in the lateral direction functions as a movable starting point 352. Specifically, the movable starting point 352 is provided as a part of the coupling portion 350. When the pressed portions 334, 344 are moved downward, the movable starting point 352 is moved downward in cooperation with movements of the first beam portion 330 and the second beam portion 340.

The connection end portion 360 connects the first front end portion 336 of the first beam portion 330 with the second front end portion 346 of the second beam portion 340. The connection end portion 360 is provided with a single movable end portion 362. Specifically, the movable end portion 362 comprises the first front end portion 336 and the second front end portion 346, and is formed as a part of the connection end portion 360. As understood from FIGS. 6, 7 and 11, the movable end portion 362 is positioned forward (toward a positive X-side) of the pressed portions 334, 344. Specifically, each of the pressed portions 334, 344 is positioned between the movable end portion 362 and the fixed portion 310. Especially, each of the pressed portions 334, 344 of the present embodiment is positioned between the movable end portion 362 and the coupling portion 350. As shown in FIG. 6, in the initial state, the movable end portions 362 are positioned apart from the receiving portion 110F, respectively. As understood from FIGS. 6, 7 and 11, when the inserting object (card 20 shown in FIG. 12 or card adapter 30 shown in FIG. 13) is accommodated in the accommodation portion 12 so that the pressed portions 334, 344 are pressed by the press portion (first front edge 22 or second front edge 34) to deform the front contacts 300, the movable end portions 362 are received in the aforementioned receiving portions 110F of the holding member 100, respectively, and are slid to be moved on the receiving portions 110F, respectively.

In the present embodiment, the first front end portion 336 of the first beam portion 330 and the second end portion 346 of the second beam portion 340 are unified by the connection end portion 360, so that the first spring portion 320 includes the single the movable end portion 362. Accordingly, even if the card 20 (see FIG. 12) is inserted into the connector 10 in a direction obliquely to the front-rear direction, the first spring portion 320 can be prevented from being broken.

With reference to FIGS. 6 and 7, the second spring portion 370 extends forward from the movable starting point 352. The second spring portion 370 is provided with a front end 372 and a contact point 374. The front end 372 functions as a free end. The contact point 374 is to be brought into contact with one of the electrodes 24 of the card 20 (see FIG. 12). The contact point 374 is positioned between the front end 372 and the movable starting point 352. As shown in FIG. 7, the second spring portion 370 is positioned between the two pressed portions 334, 344 in the lateral direction.

As understood from FIGS. 6 and 7, the front end 372 of the second spring portion 370 is positioned rearward (toward a negative X-side) of the pressed portions 334, 344. When the inserting object (card 20 shown in FIG. 12 or card adapter 30 shown in FIG. 13) is moved in the moving direction (rearward), the inserting object brings into abutment with the pressed portions 334, 344 before arriving at a position of the front end 372 and then pushes the pressed portions 334, 344 downward. Since the pressed portions 334, 344 are pushed downward as described above, the movable starting point 352 is moved downward. Accordingly, the second spring portion 370 is moved downward together with the aforementioned movement of the movable starting point 352. In the present embodiment, the second spring portion 370 is moved downward from its initial position when the inserting object arrives at the position of the front end 372 of the second spring portion 370 in the front-rear direction, so that the inserting object is prevented from being brought into contact with the front end 372 of the second spring portion 370. Thus, the front contacts 300, especially the second spring portions 370, are prevented from being buckled when the inserting object is inserted into the connector 10.

As shown in FIG. 7, the first beam portion 330 has a first upper surface 332, and the second beam portion 340 has a second upper surface 342. In the initial state, when the front contact 300 is seen along the lateral direction, the front end 372 of the second spring portion 370 of the present embodiment is positioned below (toward a negative Z-side of) the first upper surface 332 of the first beam portion 330 and below (toward the negative Z-side of) the second upper surface 342 of the second beam portion 340. Specifically, the front end 372 of the second spring portion 370 is positioned below a surface (curved surface) which is formed by the first upper surface 332 of the first beam portion 330 and the second upper surface 342 of the second beam portion 340. Accordingly, each of the front contacts 300 is absolutely prevented from being buckled. However, the present invention is not limited thereto. Unless the inserting object brings into abutment with the front end 372 of the second spring portion 370, the front end 372 of the second spring portion 370 may be positioned above (toward the positive Z-side of) the first upper surface 332 of the first beam portion 330 and above (toward the positive Z-side of) the second upper surface 342 of the second beam portion 340 in the initial state.

Figure 4:
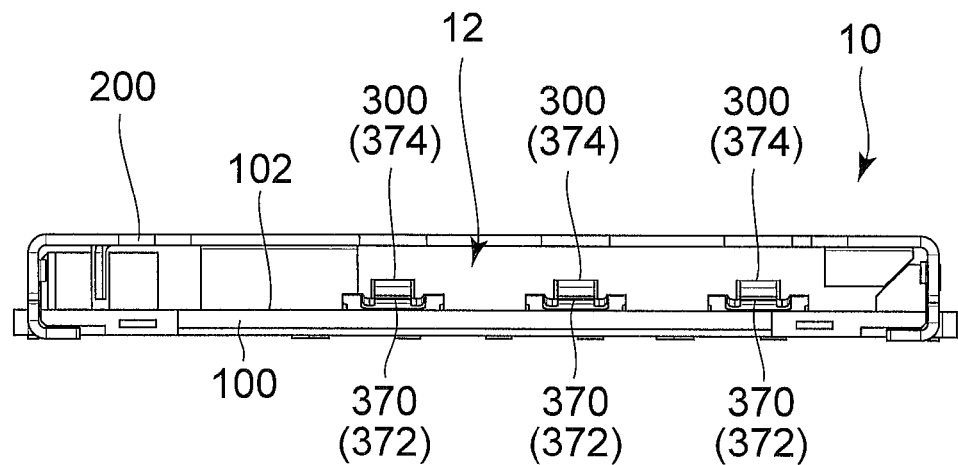
FIG. 4 is a front view showing the connector of FIG. 2.
Figure 4:
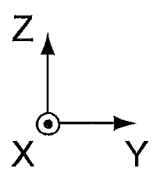
Figure 9:
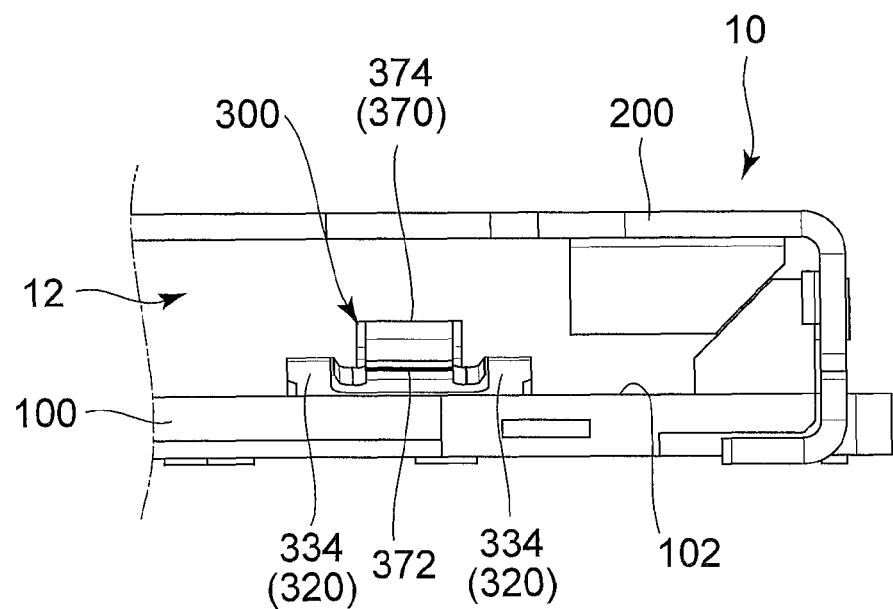
FIG. 9 is an enlarged, front view showing a part of the connector of FIG. 4.

As shown in FIGS. 4, 6 and 9, the front end 372 of the second spring portion 370 is positioned above (toward the positive Z-side of) the principal surface 102 of the holding member 100 in the initial state. Accordingly, it is possible to make a position of the contact point 374 higher, so that a sufficient moving distance of the contact point 374 can be secured. Thus, a sufficient contact pressure can be secured between the contact point 374 and the electrode 24 of the card 20 (see FIG. 12).

As shown in FIG. 11, the front end 372 of the second spring portion 370 is provided so as not to reach the mount surface 52 of the circuit board 50 in a state where the electrode 24 of the card 20 (see FIG. 12) is brought into contact with the contact point 374. Specifically, the front end 372 of the second spring portion 370 never abuts against the circuit board 50. Accordingly, the circuit board 50 can be prevented from being damaged, and the second spring portion 370 can be prevented from being deformed.

Figure 8:
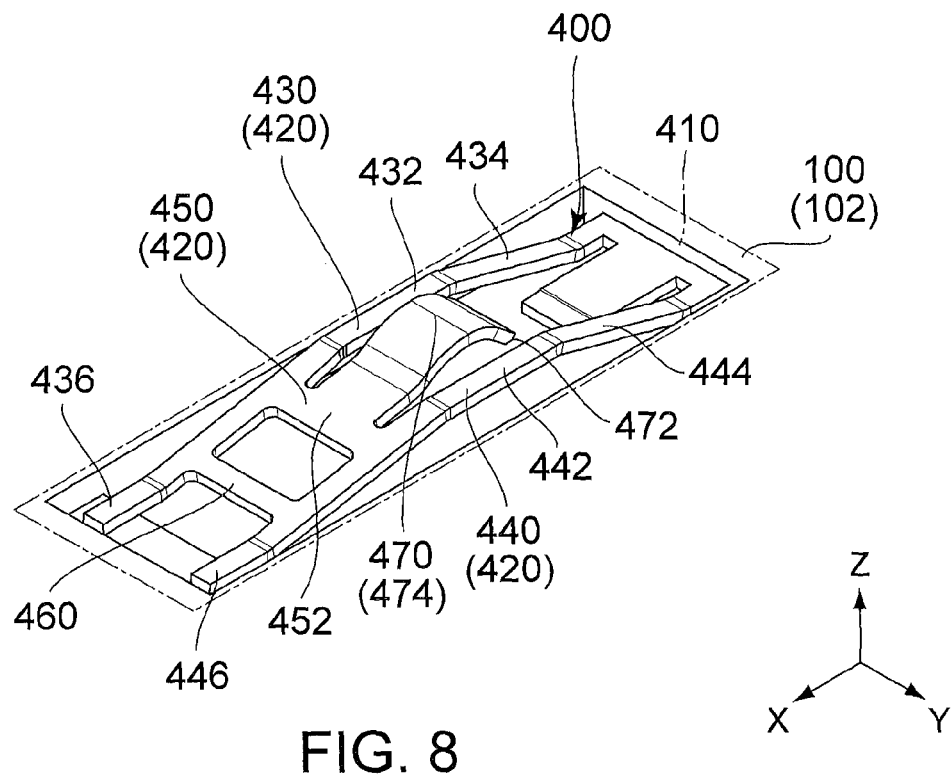
FIG. 8 is an enlarged perspective view showing a rear contact and the vicinity thereof which are included in the connector of FIG. 1.

As understood from FIGS. 6 and 8, each of the rear contacts 400 has a fixed portion 410, a first spring portion 420 and a second spring portion 470. The fixed portion 410 is held by and fixed on the holding member 100. The first spring portion 420 extends from the fixed portion 410. The second spring portion 470 extends from the first spring portion 420.

As shown in FIG. 8, the first spring portion 420 has a first beam portion 430, a second beam portion 440, a coupling portion 450 and an additional coupling portion 460.

As shown in FIG. 8, each of the first beam portion 430 and the second beam portion 440 extends roughly in the front-rear direction. The first beam portion 430 has a pressed portion 434 and a first front end portion 436. As shown in FIG. 6, the pressed portion 434 intersects the front-rear direction in the initial state. As understood from FIGS. 6 and 8, the second beam portion 440 has a pressed portion 444 and a second front end portion 446, and the pressed portion 444 intersects the front-rear direction in the initial state. Accordingly, when the inserting object (card adapter 30 shown in FIG. 13) is moved along the moving direction (forward), the pressed portions 434, 444 are pressed by the press portion (i.e. inner wall 36) to be moved downward.

As shown in FIG. 8, the coupling portion 450 couples the first beam portion 430 with the second beam portion 440 in the lateral direction. Similarly, the additional coupling portion 460 couples the first beam portion 430 with the second beam portion 440 in the lateral direction. Specifically, a ladder shape is formed by the first beam portion 430, the second beam portion 440, the coupling portion 450 and the additional coupling portion 460. In the present embodiment, a middle of the coupling portion 450 in the lateral direction functions as a movable starting point 452. Specifically, the movable starting point 452 is provided as a part of the coupling portion 450. When the pressed portions 434, 444 are moved downward, the movable starting point 452 is moved downward in cooperation with movements of the first beam portion 430 and the second beam portion 440.

Each of the first front end portion 436 of the first beam portion 430 and the second front end portion 446 of the second beam portion 440 functions as a movable end portion. In other words, each of the rear contacts 400 of the present embodiment has two movable end portions 436, 446. As understood from FIGS. 6 and 8, each of the movable end portions 436, 446 is positioned forward (toward the positive X-side) of the pressed portions 434, 444. Specifically, each of the pressed portions 434, 444 is positioned between the movable end portions 436, 446 and the fixed portion 410. Especially, each of the pressed portions 434, 444 of the present embodiment is positioned between the fixed portion 410 and the coupling portion 450. The movable end portions 436 correspond to the receiving portions 1108, respectively. Similarly, the movable end portions 446 correspond to the receiving portions 110R, respectively. As shown in FIG. 6, in the initial state, the movable end portions 436, 446 are positioned apart from the corresponding receiving portion 110R. As understood from FIGS. 6 and 8, when the inserting object (card adapter 30 shown in FIG. 13) is moved in the removal direction (forward) so that the pressed portions 434, 444 are pressed by the press portion (i.e. inner wall 36) to deform the rear contacts 400, the movable end portions 436, 446 are received in the corresponding receiving portions 110R of the holding member 100 and are slid to be moved on the corresponding receiving portions 110R.

In the present embodiment, the two movable end portions 436, 446 are received by the corresponding receiving portion 1108, so that stresses applied to the movable end portions 436, 446 can be dispersed.

With reference to FIGS. 6 and 8, the second spring portion 470 extends rearward from the movable starting point 452. The second spring portion 470 is provided with a rear end 472 and a contact point 474. The rear end 472 functions as a free end. The contact point 474 is to be brought into contact with one of the electrodes 24 of the card 20 (see FIG. 12). The contact point 474 is positioned between the rear end 472 and the movable starting point 452. As shown in FIG. 8, the second spring portion 470 is positioned between the two pressed portions 434, 444 in the lateral direction.

As understood from FIGS. 6 and 8, the rear end 472 of the second spring portion 470 is positioned forward (toward the positive X-side) of the pressed portions 434, 444. Accordingly, when the inserting object (card adapter 30 shown in FIG. 13) is moved in the moving direction (forward), the press portion (inner wall 36) of the inserting object brings into abutment with the pressed portions 434, 444 before arriving at a position of the rear end 472 and pushes the pressed portions 434, 444 downward. Since the pressed portions 434, 444 are pushed downward as described above, the movable starting point 452 is moved downward. Accordingly, the second spring portion 470 is moved downward together with the aforementioned movement of the movable starting point 452. In the present embodiment, the second spring portion 470 is moved downward from its initial position when the press portion (inner wall 36) of the inserting object arrives at the position of the rear end 472 of the second spring portion 470 in the front-rear direction, so that the press portion of the inserting object is prevented from being brought into contact with the rear end 472 of the second spring portion 470. Thus, the rear contacts 400, especially the second spring portions 470, are prevented from being buckled when the inserting object is inserted into the connector 10.

As shown in FIG. 8, the first beam portion 430 has a first upper surface 432, and the second beam portion 440 has a second upper surface 442. In the initial state, when the rear contact 400 is seen along the lateral direction, the rear end 472 of the second spring portion 470 of the present embodiment is positioned below (toward the negative Z-side of) the first upper surface 432 of the first beam portion 430 and below (toward the negative Z-side of) the second upper surface 442 of the second beam portion 440. Specifically, the rear end 472 of the second spring portion 470 is positioned below a surface (curved surface) which is formed by the first upper surface 432 of the first beam portion 430 and the second upper surface 442 of the second beam portion 440. Accordingly, each of the rear contacts 400 is absolutely prevented from being buckled. However, the present invention is not limited thereto. Unless the press portion (inner wall 36) of the inserting object brings into abutment with the rear end 472 of the second spring portion 470, the rear end 472 of the second spring portion 470 may be positioned above (toward the positive Z-side of) the first upper surface 432 of the first beam portion 430 and above (toward the positive Z-side of) the second upper surface 442 of the second beam portion 440 in the initial state.

Figure 5:
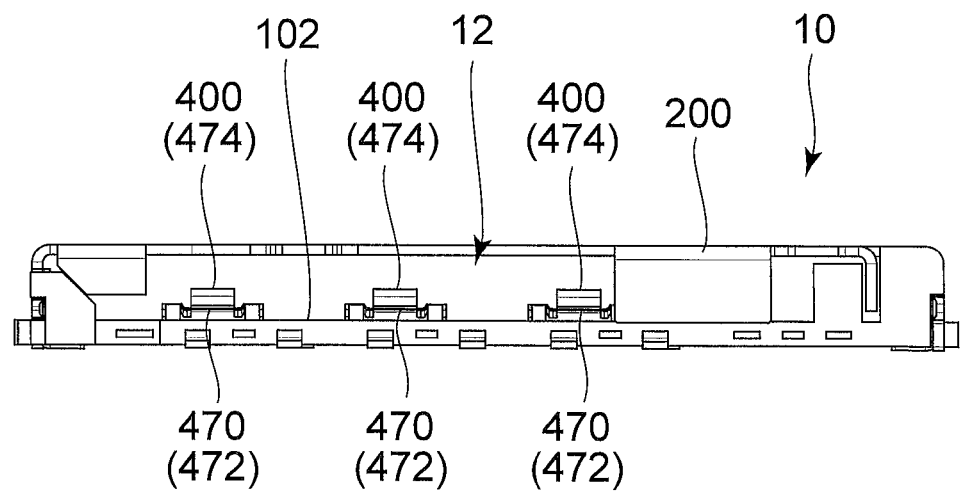
FIG. 5 is a rear view showing the connector of FIG. 2.
Figure 5:
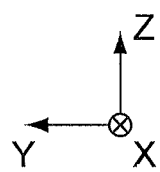
Figure 10:
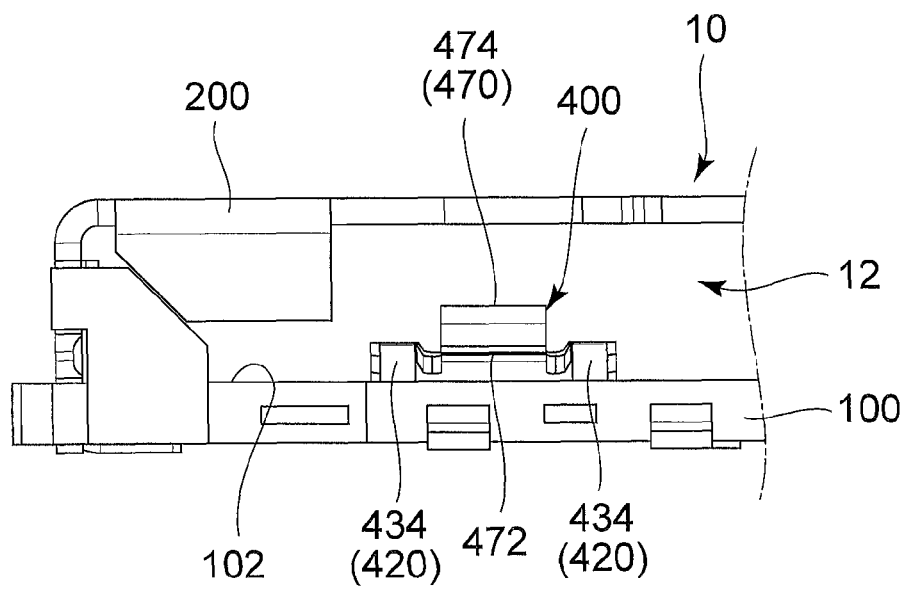
FIG. 10 is an enlarged, rear view showing a part of the connector of FIG. 5.

As shown in FIGS. 5, 6 and 10, the rear end 472 of the second spring portion 470 is positioned above (toward the positive Z-side of) the principal surface 102 of the holding member 100 in the initial state. Accordingly, it is possible to make a position of the contact point 474 higher, so that a sufficient moving distance of the contact point 474 can be secured. Thus, a sufficient contact pressure can be secured between the contact point 474 and the electrode 24 of the card 20 (see FIG. 12).

Similar to the aforementioned front contact 300 as shown in FIG. 11, the rear end 472 of the second spring portion 470 is provided so as not to reach the mount surface 52 of the circuit board 50 in a state where the electrode 24 of the card 20 (see FIG. 12) is brought into contact with the contact point 474. Specifically, the rear end 472 of the second spring portion 470 never abuts against the circuit board 50. Accordingly, the circuit board 50 can be prevented from being damaged, and the second spring portion 470 can be prevented from being deformed.

While the present invention has been described with specific embodiments, the present invention is not limited to the aforementioned embodiment. Various modifications and applications are possible with the present invention. For example, the first spring portion 320 of the front contact 300 may have an hourglass-like outline, and the first spring portion 420 of the rear contact 400 may have an hourglass-like outline.

In the aforementioned embodiment, the movable end portion 362 is positioned apart from the receiving portion 110F in the initial state. In addition, in the aforementioned embodiment, the movable end portions 436, 446 are positioned apart from the corresponding receiving portion 110F in the initial state. However, the present invention is not limited thereto. For example, the movable end portion 362 may be brought into contact with the receiving portion 110F in the initial state. In addition, the movable end portions 436, 446 may be brought into contact with the corresponding receiving portion 110R in the initial state.

In the aforementioned embodiment, the first front end portion 336 of the first beam portion 330 and the second front end portion 346 of the second beam portion 340 are unified by the connection end portion 360 into a single part. As in the first beam portion 430 and the second beam portion 440 of the rear contact 400, the first front end portion 336 of the first beam portion 330 and the second front end portion 346 of the second beam portion 340 may function as movable end portions, respectively, without being provided with the connection end portion 360. In that case, stresses applied to the first front end portions 336 and the second front end portion 346 can be dispersed. However, the front contact 300 might be broken when the card (see FIG. 12) is obliquely inserted into the connector 10. Accordingly, it is preferred to provide the connection end portion 360 as in the aforementioned embodiment.

In the aforementioned embodiment, the second spring portion 370 of the front contact 300 extends forward from the movable starting point 352 of the coupling portion 350. As in the rear contact 400, the second spring portion 370 may extend rearward from the movable starting point 352 of the coupling portion 350. In that case, the front contact 300 must be designed so as not to be buckled when the card adapter 30 without receiving the card 20 is removed from the connector 10. Thus, it is necessary for the pressed portions 334, 344 to be positioned rearward of a rear end (free end) of the second spring portion 370 as in the pressed portions 434, 444.

Figure 14:
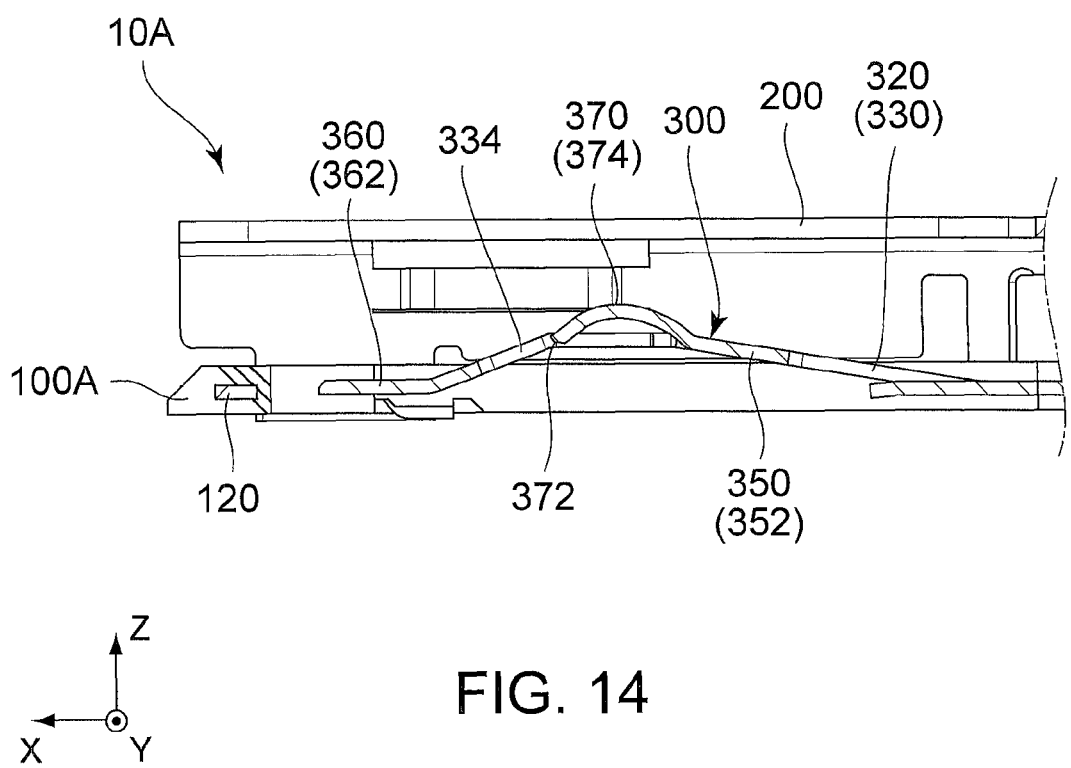
FIG. 14 is a cross-sectional view showing a part of a connector according to a modification.

Although the holding member 100 of the present embodiment is provided with the receiving portions 110F, 110R as described above, the present invention is not limited thereto. For example, as shown in FIG. 14, a holding member 100A of a connector 10A according to a modification is not provided with a portion equivalent to the receiving portion. Similarly, the receiving portion 110R does not need to be provided. In that case, a part of the mount surface 52 of the circuit board 50 (see FIG. 11) provides a function similar to a function of the receiving portion, so that a moving distance of the contact point 374 is varied according to a mounted state where the connector 10 is mounted on the circuit board 50. Accordingly, in order to secure a constant contact pressure between the contact point 374 and the electrode 24 of the card 20 (see FIG. 12), it is preferred for the connector 10 to be configured as in the aforementioned embodiment.

Figure 15:
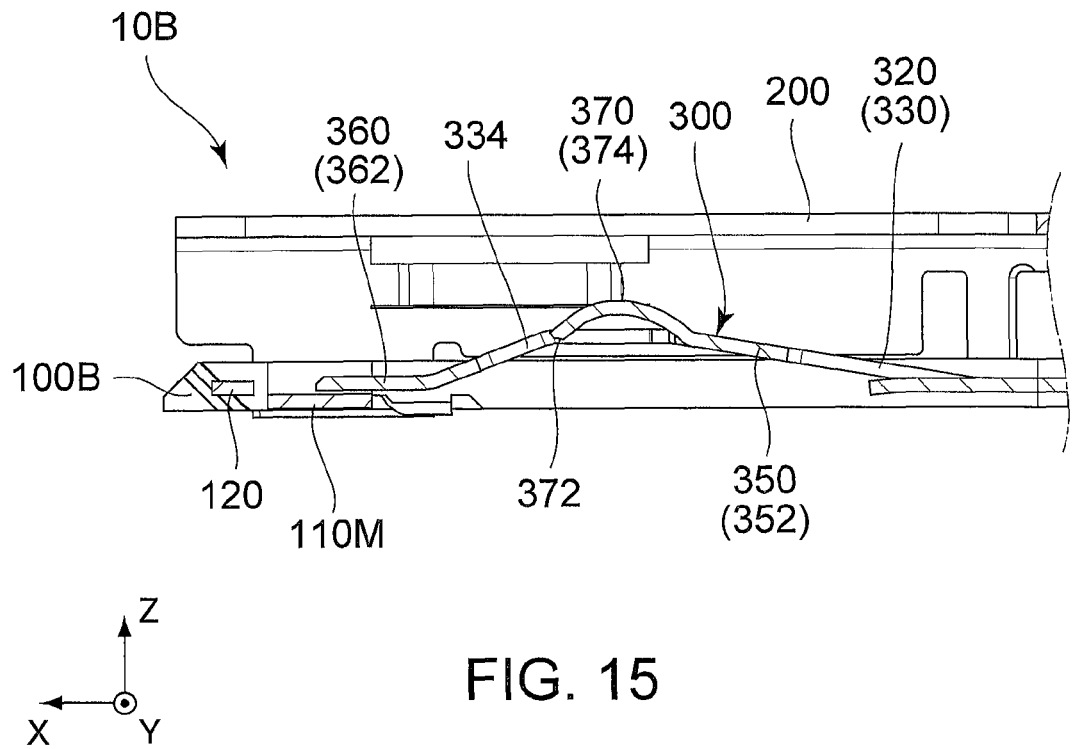
FIG. 15 is a cross-sectional view showing a part of a connector according to another modification.
Figure 16:
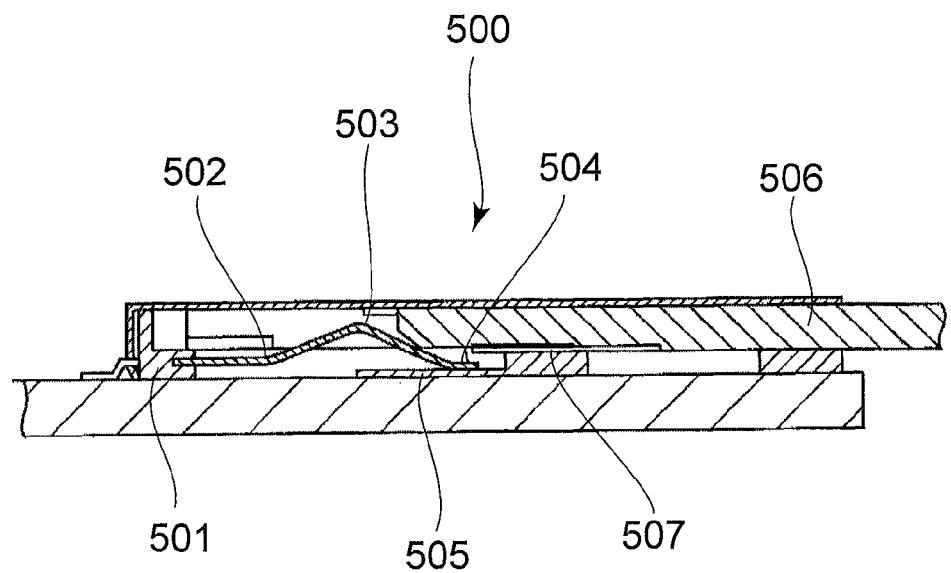
FIG. 16 is a cross-sectional view showing a connector of patent Document 1.

As shown in FIG. 15, a holding member 100B of a connector 10B according to another modification incorporates a receiving portion 110M made of metal. When the pressed portions 334, 344 are pressed by the press portion (first front edge 22 of the card 20 shown in FIG. 12 or second front edge 34 of the card adapter 30 shown in FIG. 13) to deform the front contact 300, the receiving portion 110M movably receives the movable end portion 362. The receiving portion 110M may be formed by using a part of a modified front contact whose shape is modified from that of the front contact 300. In addition, the receiving portion 110M may be formed by using a part of the reinforcing member 120. FIG. 15 shows only the receiving portion 110M which corresponds to the front contact 300. A receiving portion which corresponds to the rear contact 400 may be formed similar to the receiving portion 110M.

In the aforementioned embodiment, the first spring portion 320 of the front contact 300 has the portion having the H-like shape which is formed by the first beam portion 330, the second beam portion 340 and the coupling portion 350. However, the present invention is not limited thereto. For example, the first spring portion 320 may have a Y-like shape, wherein the first spring portion 320 is branched at a branching point into two arms. In that case, the second spring portion 370 extends from the branching point, and the pressed portions 334, 344 are provided on the two arms, respectively. The first spring portion 420 of the rear contact 400 also may be modified similarly.

In the aforementioned embodiment, the connector 10 is used for the micro SIM card. However, the present invention is not limited thereto. For example, the card 20 may be a normal SIM card. Specifically, the connector 10 may be used for the normal SIM card. In that case, the card adapter 30 is used for connecting, for example, the micro SIM card to the connector 10.

In the aforementioned embodiment, in order to remove the inserting object (card 20 or card adapter 30) from the connector 10, it is necessary for an operator to push the inserting object in the forward direction by his/her finger. The connector 10 may be provided with a push-push mechanism which ejects the inserting object (card 20 or card adapter 30) when the inserting object is released after being pushed in the rearward direction.

The present application is based on a Japanese patent application of JP2014-079932 filed before the Japan Patent Office on Apr. 9, 2014, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector into which a card is insertable along a rearward direction, the card being removable from the connector along a forward direction, the card having an electrode, wherein:
   the connector comprises a holding member and a contact which is held by the holding member;
   the contact has a fixed portion, a first spring portion and a second spring portion;
   the fixed portion is held by and fixed on the holding member;
   the first spring portion extends from the fixed portion;
   the first spring portion includes two pressed portions, a movable starting point and a movable end portion;
   the movable end portion is movable;
   each of the two pressed portions is positioned between the movable end portion and the fixed portion;
   when an inserting object is moved along a moving direction which is the forward direction or the rearward direction, the pressed portions are pressed by a press portion to be moved downward perpendicular to the moving direction;
   the inserting object is the card or a card adapter;
   the inserting object has the press portion;
   the card adapter has a frame body;
   the frame body has an outer shape same as a shape of the card;
   when the pressed portions are moved downward, the movable starting point is moved downward;
   the second spring portion extends from the movable starting point;
   the second spring portion is positioned between the two pressed portions in a lateral direction perpendicular to both the moving direction and a downward direction;
   the second spring portion is provided with a free end and a contact point;
   the contact point is to be brought into contact with the electrode of the card;
   the contact point is positioned between the free end and the movable starting point;
   when the inserting object is moved in the moving direction, the second spring portion is moved downward together with a movement of the movable starting point so that the inserting object is prevented from being brought into contact with the free end of the second spring portion;
   the first spring portion has a first beam portion, a second beam portion and a coupling portion;
   the coupling portion couples the first beam portion with the second beam portion in the lateral direction;
   one of the pressed portions is provided as a part of the first beam portion;
   a remaining one of the pressed portions is provided as a part of the second beam portion; and
   the movable starting point is provided as a part of the coupling portion.

2. The connector as recited in claim 1, wherein:
   the holding member is formed with a receiving portion; and
   when the pressed portions are pressed by the press portion to deform the contact, the receiving portion movably receives the movable end portion.

3. The connector as recited in claim 1, wherein:
   the holding member incorporates a receiving portion;
   the receiving portion is made of metal; and
   when the pressed portions are pressed by the press portion to deform the contact, the receiving portion movably receives the movable end portion.

4. The connector as recited in claim 1, wherein:
   the first beam portion has a first upper surface;
   the second beam portion has a second upper surface; and
   when the contact is seen along the lateral direction, the free end of the second spring portion is positioned below the first upper surface of the first beam portion and below the second upper surface of the second beam portion.

5. The connector as recited in claim 1, wherein:
   the first beam portion has a first front end portion;
   the second beam portion has a second front end portion; and
   the movable end portion comprises the first front end portion and the second front end portion.

6. The connector as recited in claim 1, wherein:
   the first beam portion has a first front end portion;
   the second beam portion has a second front end portion;
   the first spring portion has a connection end portion which connects the first front end portion with the second front end portion; and
   the movable end portion is formed as a part of the connection end portion.

7. The connector as recited in claim 1, wherein:
   the moving direction is the rearward direction; the card has a first front edge;
   the card adapter has a second front edge;
   when the card is inserted into the connector, the first front edge functions as the press portion; and
   when the card adapter is inserted into the connector, the second front edge functions as the press portion.

8. The connector as recited in claim 7, wherein:
   the connector comprises a front contact and a rear contact;
   the front contact functions as the contact;
   the front contact is positioned forward of the rear contact;
   the rear contact is held by the holding member;
   the second spring portion extends forward from the movable starting point;
   the second spring portion has a front end; and
   the front end functions as the free end.

9. The connector as recited in claim 1, wherein:
   the inserting object is the card adapter;
   the moving direction is the forward direction;
   the frame body has an inner wall;
   the press portion is a part of the inner wall; and
   the press portion intersects the forward direction.

10. The connector as recited in claim 9, wherein:
    the connector comprises a front contact and a rear contact;
    the front contact is held by the holding member;
    the front contact is positioned forward of the rear contact;
    the rear contact functions the contact;
    the second spring portion extends rearward from the movable starting point;
    the second spring portion has a rear end; and
    the rear end functions as the free end.

11. The connector as recited in claim 1, wherein:
the connector further comprises a shell;
the shell is attached to the holding member;
the shell forms an accommodation portion together with the holding member;
the accommodation portion accommodates, at least in part, the inserting object;
the holding member has a principal surface which forms a bottom surface of the accommodation portion; and
in a state where the inserting object is not accommodated in the accommodation portion, the free end of the second spring portion is positioned above the principal surface of the holding member.

12. The connector as recited in claim 1, wherein:
the connector is fixed on a mount surface of a circuit board when used; and
the free end of the second spring portion is provided so as not to reach the mount surface of the circuit board in a state where the electrode of the card is brought into contact with the contact point.

* * * * *